Aug. 8, 1961  J. W. TAYLOR ET AL  2,995,146
AUTOMATIC SHUT-OFF VALVE
Filed Dec. 24, 1959  2 Sheets-Sheet 1
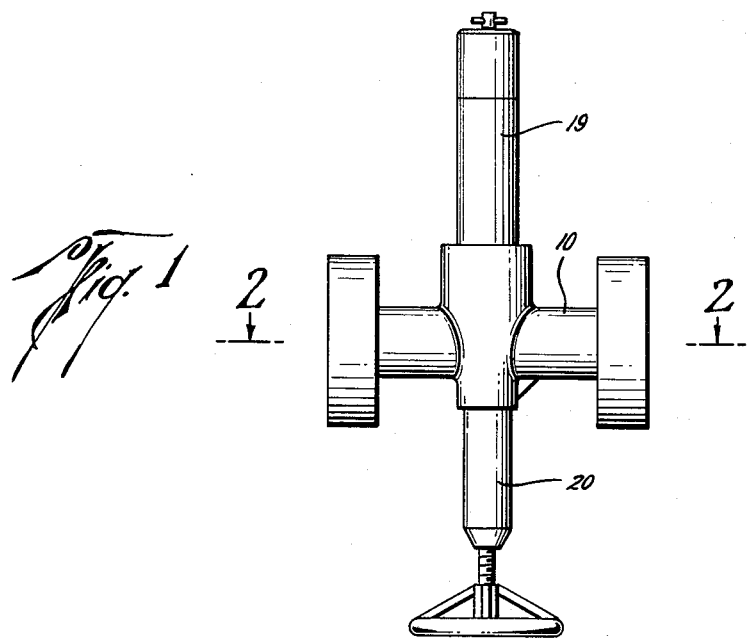
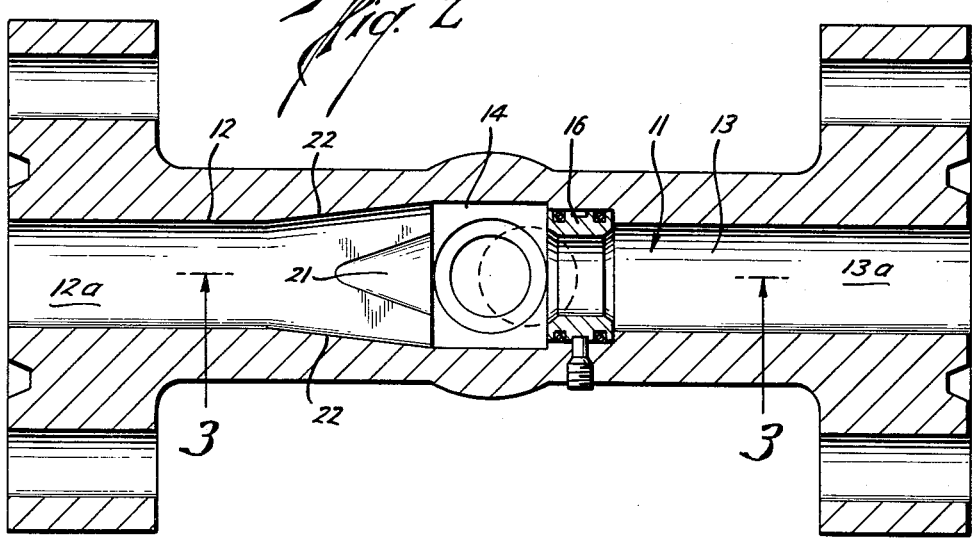
Joseph W. Taylor
Bolling A. Abercrombie
Vernon B. Scott
INVENTORS

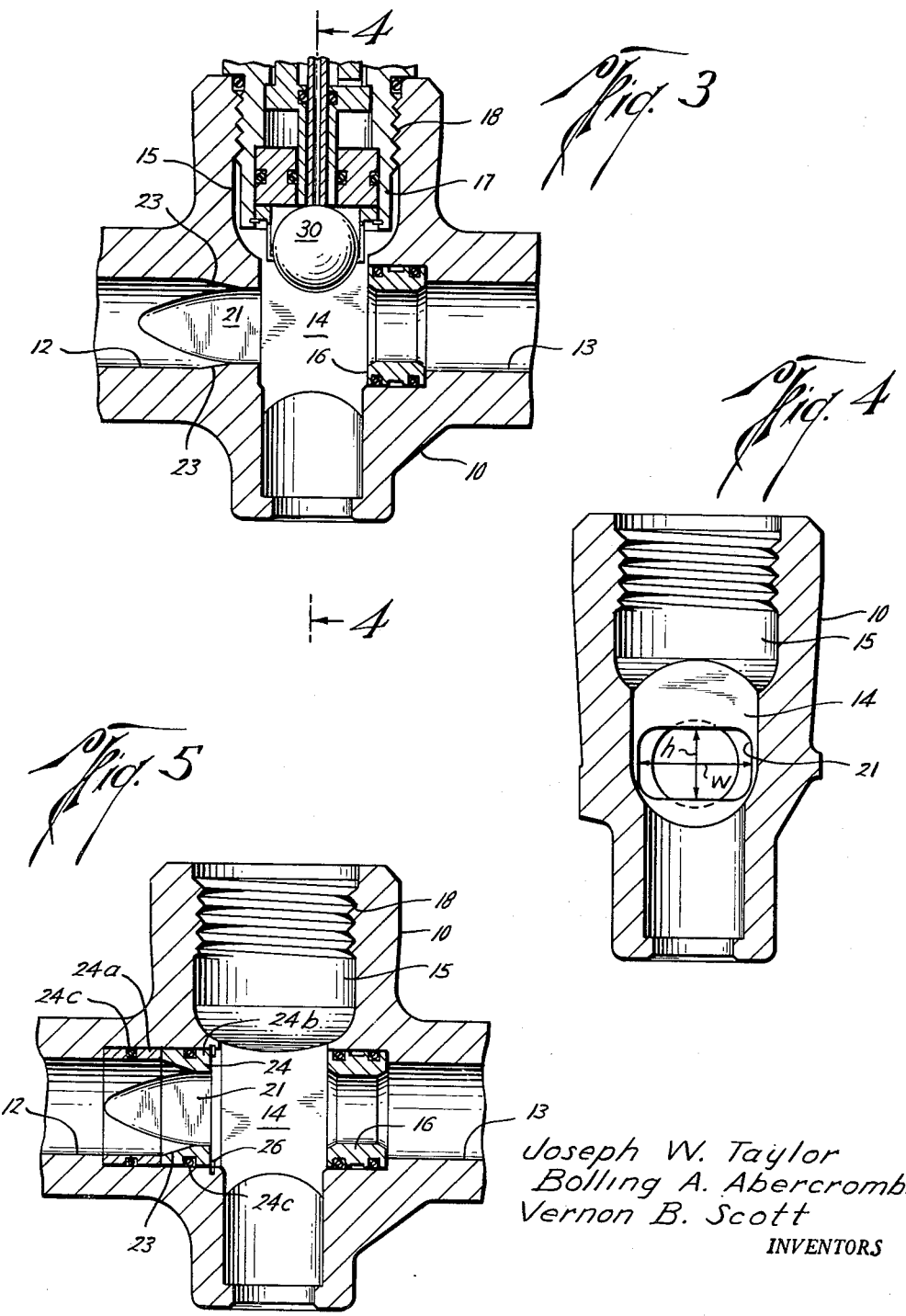

United States Patent Office 2,995,146
Patented Aug. 8, 1961

2,995,146
AUTOMATIC SHUT-OFF VALVE
Joseph W. Taylor, Bolling A. Abercrombie, and Vernon B. Scott, Longview, Tex., assignors to U.S. Industries, Inc., a corporation of Delaware
Filed Dec. 24, 1959, Ser. No. 861,997
7 Claims. (Cl. 137—458)

This invention relates to an improvement in a ball type automatic shut-off valve.

Automatic shut-off valves of the ball type are well known to the art and valves of this type are illustrated by the patents to Meynig, 2,635,626 and 2,667,890 as well as the patent to Liljestrand, 2,834,371. While valves illustrated in the foregoing patents have met with marked success, they have been subject, on occasions, to certain disadvantages. For example, it has been found that under certain flow conditions, particularly those involving relatively high flow velocities through the valve, the ball has on occasion been pulled from its holder so as to prematurely close the valve, that is, the valve is closed at a time when the control pressure acting on the control head does not dictate closing of the valve. Referring to the Liljestrand patent, it is believed that what has happened is that the reduced size of the upstream and downstream seats, relatively to the remainder of the flow passage at the inlet and outlet to the valve, creates a venturi effect in the space between the seats and below the ball. Sudden surges of flow or even high constant flow velocities, may create a low pressure in this space and cause the ball to be pulled from its holder so as to be prematurely seated. It has been observed that this premature seating occurs even though the control pressure conditions are not such as to cause the control head to eject the ball from the holder.

It was first thought that this problem could be overcome by increasing the force with which the ball holder clasped the ball, i.e. increase the force necessary to eject the ball from the holder. However, this required the control head to likewise exert an increased force on the ball to eject the same. To obtain this increased force, it was necessary to increase the areas that the control pressure acted upon. Since the force generated by the control pressure acting on these various areas is normally counterbalanced by springs or the like, the spring force likewise had to be increased. This resulted in many undesirable complications, such as complicated spring arrangements to achieve the desired loading rate of the spring mechanism, etc. Obviously then, it would be desirable to eliminate the problem of premature closing of the valve and yet retain all of the other advantages of the valve including a simple construction which would prevent the ball not only from being prematurely seated but also prevent passing out of the valve through the inlet passage in instances when there is backflow through the valve.

It is therefore an object of this invention to provide a ball type automatic shut-off valve in which the arrangement of the flow passage through the valve is of an improved nature such that the ball will not be prematurely seated due to flow through the valve and yet wherein the ball is prevented from moving out of the valve during periods of backflow therethrough, all without necessarily complicating the construction of the control head.

Another object of the invention is to provide a valve of the ball type in which the inlet passage upstream of the seat is so shaped as to substantially eliminate a venturi effect upstream of the seat whereby high velocities of fluid flow through the valve do not create a reduced pressure condition in the vicinity of the ball such that would cause the ball to be prematurely moved into the path of the fluid stream and then seated.

Another object of the invention is to provide such a valve having an inlet so shaped as to permit positive retention of the valve laterally of the seat during periods of high velocity flow without necessarily increasing the retaining force exerted by the ball holder in retaining the ball in its lateral position whereby the control head can remain relatively simple and sensitive.

Other objects, advantages and features of the invention will be apparent to one skilled in the art upon a consideration of the specification, the claims and the attached drawings wherein:

FIG. 1 is an elevational view of a valve embodying the concept of this invention;

FIG. 2 is a horizontal cross section of the valve body taken on the line 2—2 of FIG. 1;

FIG. 3 is a partial vertical section of a valve body taken on the line 3—3 of FIG. 2, the resetting mechanism of FIG. 1 having been omitted in this view as well as in FIG.2 for purposes of clarity;

FIG. 4 is a view taken on the line 4—4 of FIG. 3 to better illustrate the shaping of the inlet passage; and FIG. 5 is a view similar to FIG. 3 but shows an alternative arrangement of the invention.

Like characters of reference will be used throughout the several views to designate like parts.

Referring now to the drawings, and particularly to FIGS. 1, 2 and 3, the valve in general comprises a body or housing 10 having a flow passage, designated generally by the numeral 11, extending therethrough. The flow passage, for the purposes of discussion, can be divided into an inlet portion 12 and an outlet portion 13 which are interrupted by a space 14 which extends not only between the flow passages but also laterally, as at 15, of the flow passages. A seat 16 is disposed about outlet passage portion 13 and opens out into space 14. A ball 30 is normally disposed in the lateral space 15 and may be retained in this position by a suitable ball holder 17, as indicated in FIG. 3. Connected to a side branch 18 of the valve housing is a control head 19 which has the function of projecting the ball out of the holder 17 so that it may seat on seat 16 responsive to a change in a condition, such as the pressure within the valve body, a remote pressure, a combination of these two pressures, or other control conditions. Thus it will be seen that when the ball is projected from its holder, it will move into the path of fluid flowing through the valve and be moved thereby to seated position against seat 16. For the purpose of reopening the valve, a resetting mechanism 20 is provided whose function it is to move the valve back up to retracted position in the ball holder.

For further details of control heads and resetting mechanisms which may be employed in the valve of this invention, reference is made to the above noted patents as well as to copending applications Serial No. 665,920, filed June 17, 1957, and Serial No. 684,995, filed September 19, 1957, now U.S. Patents Nos. 2,935,997 and 2,935,998, respectively.

In accordance with this invention, port means are provided at the discharge end of inlet passage portion 12 and this port means is so shaped so that fluid flowing through the valve does not cause a lowering of pressure in space 15 such as would cause the ball to prematurely move into the flow path between the flow passage and thence to seated position. The port itself is shown in the drawings as designated by the numeral 21 and the port means can be designated as that portion of the valve body which defines the port 21. It will be noted in FIG. 3 that the port means is integral with the remainder of the valve body whereas in FIG. 5 it is shown as a part of a separate insert which will be described in detail later. At any rate, the port is of non-circular cross section and has one lateral dimension which is less than the diameter of the ball to thereby prevent the latter from moving out of space 14 during any period of backflow of fluid through the valve. In this connection, it will be noted that seat 16 has a diameter smaller than that of the ball so that the latter may properly seat therein and also one which is smaller than the lateral dimensions of the flow passage through the valve except that part of the flow passage comprising port 21 and as will be pointed out later, even this port has one lateral dimension which is larger than that of the seat. This construction is preferred because it reduces the pressure drop across the valve since the seat constitutes only a minor fraction of the length of the flow passage through the valve and yet permits the use of a relatively small ball.

Port 21 is so fashioned that it has another lateral dimension which is sufficiently larger than the diameter of the seat so that the cross-sectional area of the port is larger than that of the seat and that of the inlet passage portion upstream of port 21. Stated in another manner, port 21 is made of such size that its flow capacity is greater than that of the seat and also greater than that of the inlet passage portion 12a upstream of the port whereby only a relatively small pressure drop occurs through port 21 and, in fact, since port 21 is of larger cross-sectional area than passage portion 12a, the static pressure of fluid flowing therethrough will actually increase due to its decrease in velocity. As a result, there is not any decrease in pressure in space 14 due, for example, to the venturi effect mentioned above in connection with the Liljestrand patent, such as would cause the ball to be prematurely seated.

In its preferred form, the passageway through the valve has portions 12a and 13a of circular cross section so as to conform to normal valve design and the attendant advantages thereof. Port 21, on the other hand, is preferably made substantially rectangular in cross section as best indicated in FIG. 4. From FIG. 4, it will be seen that the height h of the port is less than the diameter of the ball shown in FIG. 3 while the width w of the port is considerably greater than the diameter of seat 16 and the diameter of passage portion 12a. By making height h only slightly less than the diameter of the ball and by making width w of sufficient magnitude, the flow area through the port can be increased to be larger than that through seat 16 and that through passage portion 12a. This means then that the static pressure of fluid flowing through the valve will gradually increase up to the point where it flows through the seat. Accordingly, there can be no substantial reduction of pressure in space 14 such as would cause the ball to prematurely seat.

Since one of the advantages of the valve of this invention is that only a minimum pressure drop occurs across it when open, it is preferred to preserve this advantage by causing the walls of the port to be connected with inlet passage portion 12a in a smooth streamline manner. Thus walls 22 flare outwardly from the circular inlet passage portion 12a to merge smoothly with the walls of port 21. Similarly, the walls 23 flare inwardly from the walls of circular passage portion 12a to the walls of port 21. Therefore, with this construction, there is no abrupt change of cross section such as would cause turbulence in the fluid flow with consequent increase in pressure drop.

Referring now to FIG. 5, the port means is shown as being provided by a separable element instead of one which is integral with the valve body as in FIG. 3. Thus in this figure the port means comprises a portion of an insert 24 which can be inserted in a counterbore 25 at the discharge end of inlet passage 12. The insert in this instance also includes the streamlining walls 22 and 23. Where the space available interiorly of the valve body does not permit insertion of insert 24 as a single piece, it can be divided into two pieces for separate insertion as shown at 24a and 24b. Each of these pieces should be provided with a suitable seat means 25, such as an O-ring, as shown in FIG. 5. The insert can be maintained in place in any suitable fashion such as by a snap ring 26.

Ordinarily, it would be preferred that the port means be made integral with the remainder of the valve body as shown in FIG. 3. However, there may be occasions when the separate port means is desired. For example, it would be possible to convert existing valves to the present invention by simply counterboring them at 25 and then inserting the separate port means.

In addition to the advantages mentioned above which arise from the shape of the inlet passage when the flow rate through the valve is high or surging, there are certain advantages which are particularly apparent at low flow rates. One of these is that the fluid flow distribution brought about by the shape of the port means tends to increase the positiveness of the seating of the ball. By spreading the flow distribution laterally as is possible with the rectangular port means described, there is an increased assurance that the ball, when ejected from its holder by the control mechanism, will be swept to seated position. This is particularly true at low flow rates.

Another advantage of the shaped inlet passage and port means is that pressure drop upstream of the seat is very small. Therefore there is a reduced tendency for hydrate formation when the valve is handling fluids tending to form hydrates.

In view of the foregoing, it is believed that the operation of the valve of this invention is obvious and so further discussion thereof will not be had.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An automatic shut-off valve for a flow line comprising: a valve housing adapted to be connected as a part of a flow line and having a flow passage therethrough, said housing also having a space extending laterally of the flow passage and interrupting the latter to divide it into upstream and downstream portions; a valve seat about the downstream flow passage portion and opening out into said space; a ball normally positioned in said space laterally of the seat but projectable into the flow path between said upstream and downstream portions to be moved by flowing fluid into seating engagement with said seat; pressure responsive means carried by the housing for engaging and projecting said ball from its lateral position into said flow path responsive to a change in a control pressure; and port means forming a part of said upstream passage portion and defining an inlet port opening into said space, said port having one lateral dimension less than the diameter of the said ball to prevent the latter from moving out of said space during any backflow through the valve and having another lateral dimension sufficiently larger than the diameter of said seat so that the cross-sectional area of said port is sufficiently larger than that of the seat and that of the upstream passage portion upstream of the port so that fluid flowing through the valve does not cause a lowering of pressure in said space such as would cause the ball to prematurely move into said flow path and thence to seated position.

2. The valve of claim 1 wherein the passage portion upstream of the port means is circular in cross-section, said port is substantially rectangular in cross-section at its discharge end and wherein the walls of said port means connect the rectangular cross-section with the circular cross-section in a smooth streamline manner.

3. The valve of claim 2 wherein the height of the rectangular cross-section is less than and its width is greater than the diameter of the circular cross-section.

4. An automatic shut-off valve comprising: a valve housing having an inlet passage and an outlet passage separated by a space in the housing extending laterally of the passages; a seat about the outlet passage and opening out into said space; a ball normally positioned in the space laterally of the seat but projectable into the flow path between the inlet passage and the seat to be moved by flowing fluid into the seated position on the seat; means carried by the valve housing for so projecting said ball responsive to a predetermined condition; said housing defining said inlet passage to have a discharge portion adjacent said space with a non-circular cross-section and an inlet portion upstream of said discharge portion with a circular cross-section, the discharge portion having one lateral dimension throughout its cross-section which is less than the diameter of said ball to prevent the latter from moving out the inlet passage during any backflow through the valve, said discharge portion having another lateral dimension which is sufficiently larger than the diameter of said seat and of said inlet portion of the inlet passage that the total cross-sectional area of said discharge portion is sufficiently larger than that of said seat and of said inlet portion that fluid flowing through the valve does not cause a lowering of pressure in said space such as would cause the ball to prematurely move into said flow path and thence to seated position.

5. The valve of claim 4 wherein said body provides walls extending between said circular inlet passage portion and said discharge portion in a smooth streamline manner.

6. The valve of claim 4 wherein said discharge portion is rectangular in cross-section and has a height which is less and a width which is greater than the diameter of said circular inlet passage portion.

7. An automatic shut-off valve comprising: a valve housing having an inlet passage and an outlet passage separated by a space in the housing extending laterally of the passages; a seat about the outlet passage and opening out into said space; a ball adapted to cooperate with the seat to control flow therethrough; a ball holder in said space and positioned laterally of said passages and releasably holding the ball to one side of the flow path between the inlet passage and seat; means carried by the valve housing for moving the ball out of the ball holder and projecting the ball into said flow path responsive to a change in a condition; said housing defining said inlet passage to have a discharge portion adjacent said space with a non-circular cross-section and an inlet portion upstream of said discharge portion with a circular cross-section, the discharge portion having one lateral dimension throughout its cross-section which is less than the diameter of said ball to prevent the latter from moving out the inlet passage during any backflow through the valve, said discharge portion having another lateral dimension which is sufficiently larger than the diameter of said seat and of said inlet portion of the inlet passage that the total cross-sectional area of said discharge portion is sufficiently larger than that of said seat and of said inlet portion that fluid flowing through the valve does not cause a lowering of pressure in said space such as would cause the ball to prematurely move into said flow path and thence to seated position.

No references cited.